(12) United States Patent
Markle et al.

(10) Patent No.: US 6,701,206 B1
(45) Date of Patent: Mar. 2, 2004

(54) METHOD AND SYSTEM FOR CONTROLLING A PROCESS TOOL

(75) Inventors: Richard J. Markle, Austin, TX (US); Lance Nevala, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/138,712

(22) Filed: May 3, 2002

(51) Int. Cl.[7] .............................................. G06F 19/00
(52) U.S. Cl. ..................... 700/121; 700/95; 700/117; 438/5; 438/14
(58) Field of Search ............................. 700/95, 90, 117, 700/121–124; 438/5, 7, 14

(56) References Cited

U.S. PATENT DOCUMENTS

| | | | | |
|---|---|---|---|---|
| 5,444,538 | A | * | 8/1995 | Pellegrini .................... 356/401 |
| 5,798,528 | A | * | 8/1998 | Butsch et al. ............. 250/492.2 |
| 6,486,956 | B2 | * | 11/2002 | Byers et al. ................. 356/401 |
| 6,530,822 | B1 | * | 3/2003 | Lin ............................... 451/11 |
| 6,587,744 | B1 | * | 7/2003 | Stoddard et al. ............ 700/121 |

* cited by examiner

*Primary Examiner*—Jayprakash N. Gandhi
(74) *Attorney, Agent, or Firm*—Williams, Morgan & Amerson, P.C.

(57) ABSTRACT

A method includes processing a workpiece in accordance with a first operating recipe. The workpiece is processed in accordance with a second operating recipe subsequent to processing the workpiece in accordance with the first operating recipe. A characteristic of the workpiece is measured after processing in accordance with the second operating recipe. An operating recipe parameter is determined for the first operating recipe based on the measured characteristic. A processing line includes first and second process tools, a metrology tool, and a controller. The first process tool is configured to process a workpiece in accordance with a first operating recipe. The second process tool is configured to process the workpiece in accordance with a second operating recipe subsequent to the processing of the workpiece in accordance with the first operating recipe by the first process tool. The metrology tool is configured to measure a characteristic of the workpiece after processing in the second process tool. The controller is configured to determine an operating recipe parameter for the first operating recipe based on the measured characteristic.

35 Claims, 4 Drawing Sheets

METHOD AND SYSTEM FOR CONTROLLING A PROCESS TOOL

BACKGROUND OF THE INVENTION

1. Field of the Invention

This invention relates generally to the field of semiconductor device manufacturing and, more particularly, to a method and system for controlling a process tool.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors.

Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Metrology data collected after the processing of a wafer or lot of wafers may be used to generate feedback and/or feedforward information for use in determining a control action for the previous process tool (i.e., feedback), the subsequent process tool (i.e., feedforward), or both. Metrology data may also be used by fault detection and classification (FDC) systems employed to detect defective lots or process tools. The collection of metrology data is costly in terms of process delay and resource expenditure. Accordingly, it is generally not feasible to collect metrology data after processing of every lot or after each process step. The fact that metrology data is not collected after every process step is a first source of process control and fault detection inefficiency. The performance of the entire process may not be optimized because metrology data is not collected for every process step.

A lot that is subjected to a metrology step is typically removed from the production flow and transferred to a metrology tool where characteristics of the lot are measured. The collected metrology data may then be used to control the previous or subsequent process tool in the process flow. Typically, there is a significant time period required to complete the metrology cycle of collecting the data and determining a control action based on the metrology data. The delay inherent in the metrology cycle introduces a second source of process control and fault detection inefficiency. During this time period other lots may have been processed using the same process settings as were used on the measured lot. The effectiveness of process control activities is thus reduced due to the lag time associated with implementing automatic control actions resulting from the metrology cycle. The metrology cycle also reduces the effectiveness of FDC systems, because lots processed after a fault condition is present, but before the metrology data can be collected and processed may be in jeopardy.

The present invention is directed to overcoming, or at least reducing the effects of, one or more of the problems set forth above.

SUMMARY OF THE INVENTION

One aspect of the present invention is seen in a method that includes processing a workpiece in accordance with a first operating recipe. The workpiece is processed in accordance with a second operating recipe subsequent to processing the workpiece in accordance with the first operating recipe. A characteristic of the workpiece is measured after processing in accordance with the second operating recipe. An operating recipe parameter is determined for the first operating recipe based on the measured characteristic.

Another aspect of the present invention is seen in a processing line including first and second process tools, a metrology tool, and a controller. The first process tool is configured to process a workpiece in accordance with a first operating recipe. The second process tool is configured to process the workpiece in accordance with a second operating recipe subsequent to the processing of the workpiece in accordance with the first operating recipe by the first process tool. The metrology tool is configured to measure a characteristic of the workpiece after processing in the second process tool. The controller is configured to determine an operating recipe parameter for the first operating recipe based on the measured characteristic.

BRIEF DESCRIPTION OF THE DRAWINGS

The invention may be understood by reference to the following description taken in conjunction with the accompanying drawings, in which like reference numerals identify like elements, and in which.

Figure 1:
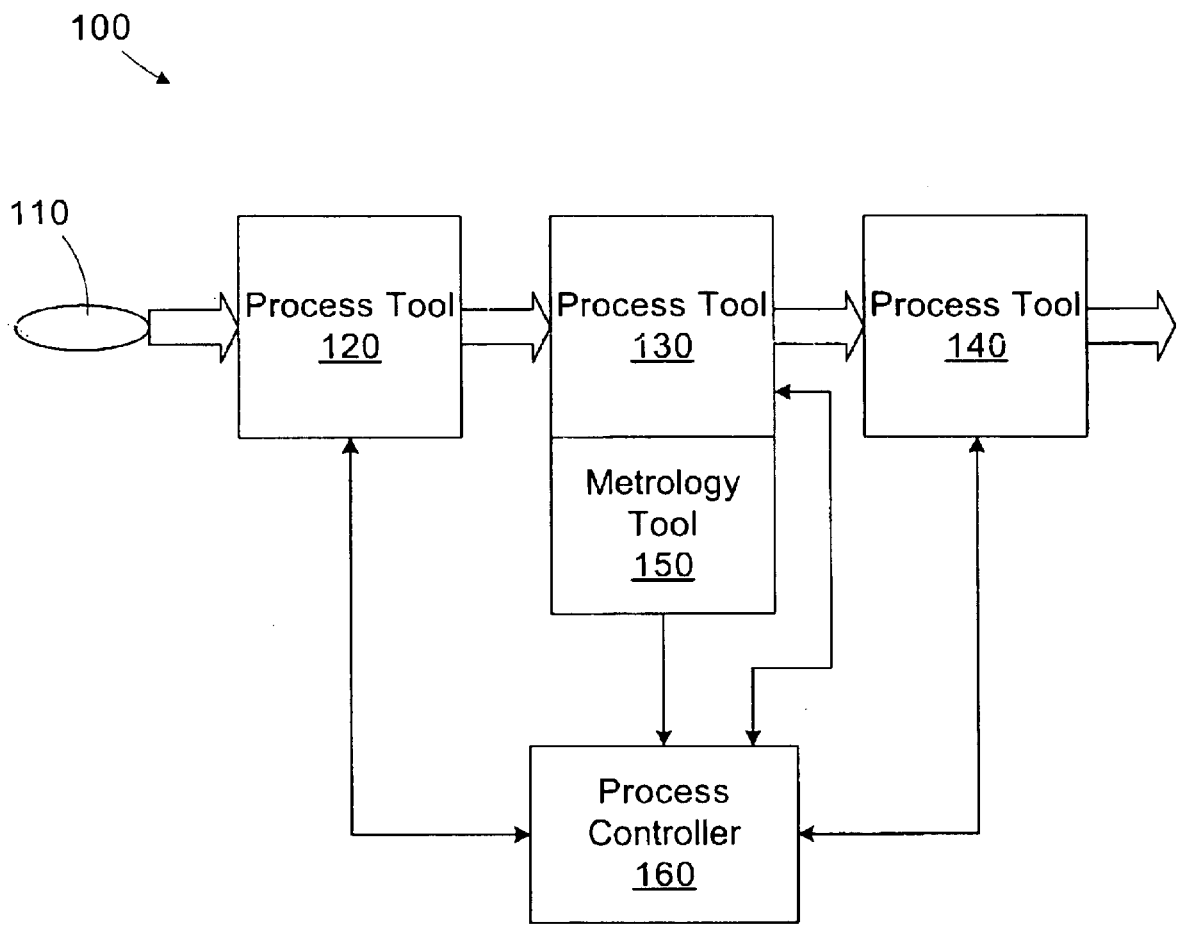
FIG. 1 is a simplified block diagram of a portion of a processing line for manufacturing semiconductor devices in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a simplified diagram of a portion of an illustrative processing line 100 for processing wafers 110 in accordance with the present invention is provided. The processing line 100 includes process tools 120, 130, 140. A metrology tool 150 is associated with the process tool 130 for measuring output characteristics of wafers 110 processed therein. In the illustrated embodiment, the metrology tool 150 is an integrated, or in-situ, metrology tool. Because the metrology tool 150 is integrated, the metrology delay is greatly reduced. Wafers 110 need not be removed from the process line 100 to a separate metrology station for data collection. Hence, additional wafers 110 are not processed in the process tool 130 prior to evaluation of the metrology data for process control or FDC purposes. A controller 160 receives data from the metrology tool 150 and performs process control or FDC functions, as desired. The controller 160 may also receive data from the process tools 120, 130, 140, such as tool and process state data, and/or data from other entities, such as a manufacturing execution system (MES) (not shown) that directs the high level operation of fabrication facility by directing the flow of workpieces. Although a single controller 160 is illustrated, it is contemplated that separate controllers may be provided for process control and fault detection. It is also contemplated that the controller 160 may not perform both functions (i.e., the controller 160 may only perform process control functions).

When operating in a process control context, the controller 160 adjusts the operating recipe of one or more of the process tools 120, 130, 140 to reduce variations in the characteristics of the processed wafers 110. A control action associated with the process tool 140 would be considered a feedforward control action, and a control action associated with either of the process tools 120, 130 would be considered feedback control actions. The particular control actions taken by the controller 160 depend on the particular processes performed by the process tools 120, 130, 140, and the particular output characteristic(s) measured by the metrology tool 150.

Although the invention is described as it may be implemented in a semiconductor fabrication facility, the invention is not so limited and may be applied to other manufacturing environments. The techniques described herein may be applied to a variety of workpieces including, but not limited to microprocessors, memory devices, digital signal processors, application specific integrated circuits (ASICs), or other similar devices. The techniques may also be applied to workpieces other than semiconductor devices.

The controller 160 may use a control model of the process tools 120, 130, 140 being controlled to generate its control actions. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, partial least squares projection to latent structures (PLS) model. The specific implementation of the model may vary depending on the modeling technique selected. Using the control model, the controller 160 may determine operating recipe parameters to reduce variation in the characteristics of the wafers 110 being processed.

In the illustrated embodiment, the controller 160 is a computer programmed with software to implement the functions described. However, as will be appreciated by those of ordinary skill in the art, a hardware controller designed to implement the particular functions may also be used. Moreover, the functions performed by the controller 160, as described herein, may be performed by multiple controller devices distributed throughout a system. Additionally, the controller 160 may be a stand-alone controller, it may be resident on one of the tools (e.g., the process tool 130), or it may be part of a system controlling operations in an integrated circuit manufacturing facility.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the processing line 100 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

Figure 2A:
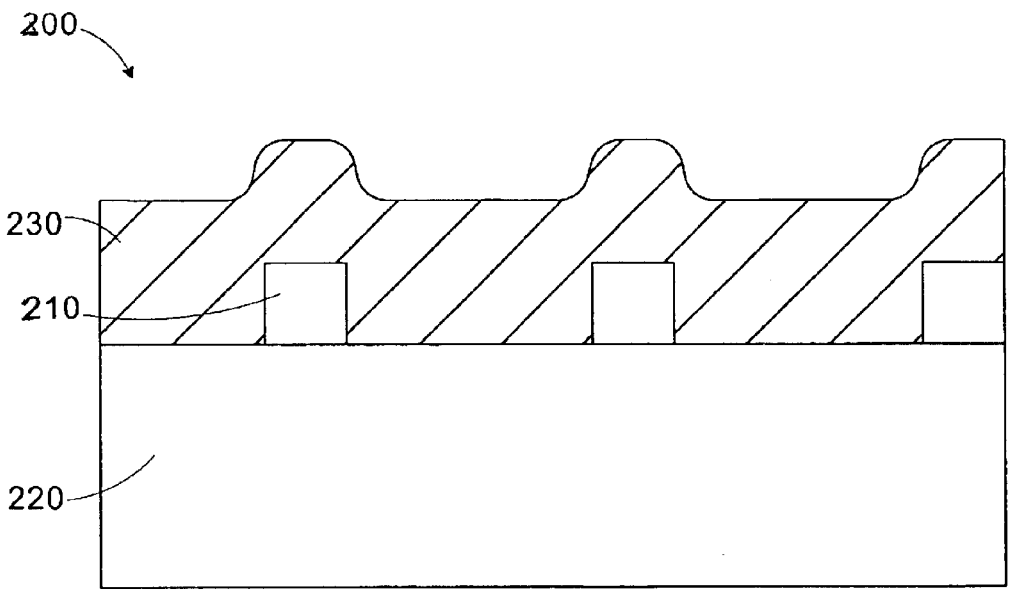
FIGS. 2A through 2C illustrate cross-section view of an exemplary semiconductor device that may be fabricated in the processing line of FIG. 1.
Figure 2B:
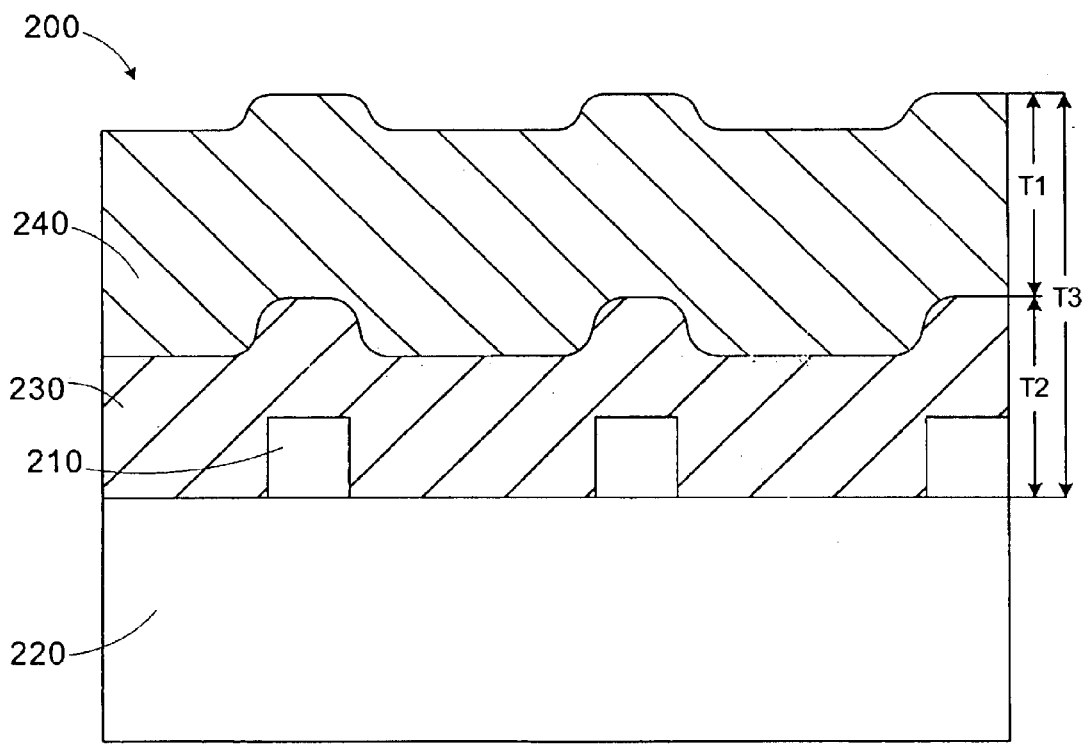
Figure 2C:
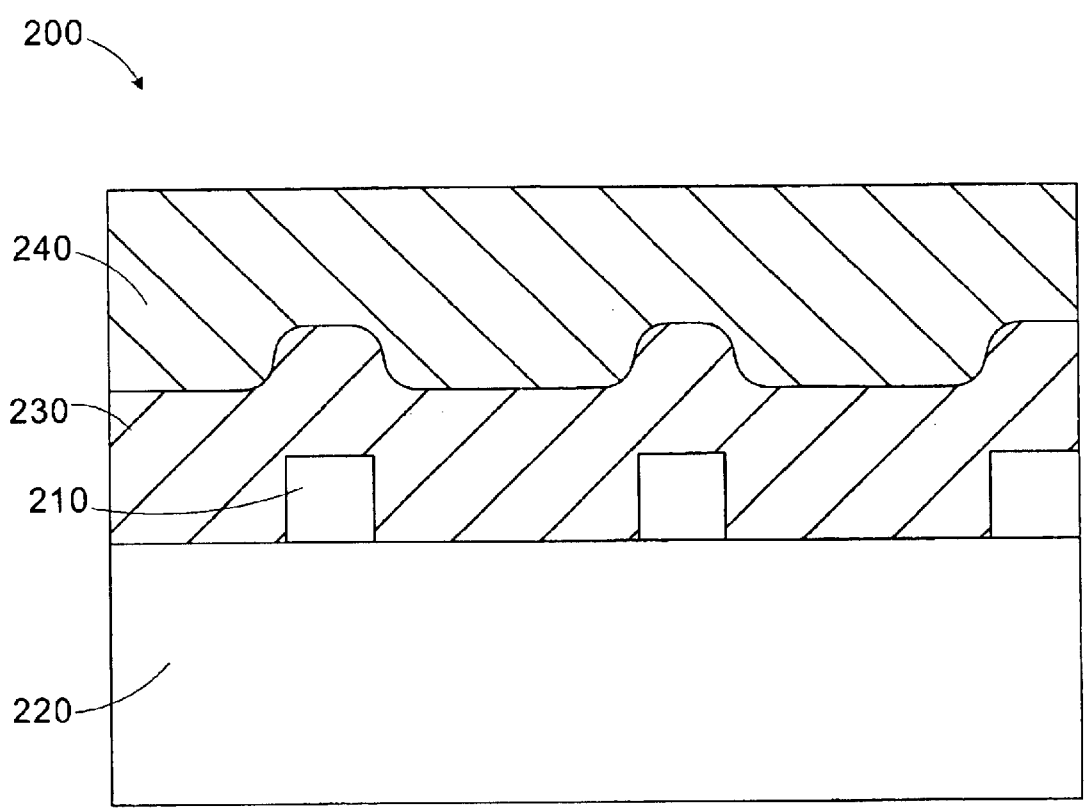

For purposes of illustration, the invention is described as it may be implemented in a portion of the process line 100 used to form an interlayer dielectric (ILD) layer on the wafer 110, as depicted in FIGS. 2A through 2C. However, the application of the present invention is not so limited, as it may be applied to other features and to a variety of different process tools. The exemplary process type, manufacturer, and model information provided below for the process and metrology tools 120, 130, 140, 150 are for illustrative purposes. Of course, other types of process or metrology tools may be used.

As seen in FIG. 2A, a cross section view of an exemplary semiconductor device 200 is provided. The semiconductor device 200 includes a plurality of features 210, such as interconnect structures or transistor gate electrode stacks, formed on a process layer 220. In the case where the features 210 are interconnects, the process layer 220 may comprise a previous ILD layer (e.g., silicon dioxide formed using tetraethoxysilane (TEOS) or fluorine doped tetraethoxysilane (F-TEOS)), and in the case where the features 210 are transistor gate electrode stacks, the process layer 220 may comprise a substrate layer.

A first ILD layer 230 is formed above the process layer 220 and the features 210 to fill the spaces between the features 210. The process tool 120 forms the ILD layer 230 using a process that results in reduced voids. Low void characteristics are desired to provide adequate insulation between adjacent features 210. In this exemplary implementation, the process tool 120 is a deposition tool, such as an high density plasma (HDP) deposition tool offered by Novellus Systems, Inc. of San Jose, Calif. configured to form the first ILD layer 230.

As shown in FIG. 2B, the process tool 130 forms a second ILD layer 240 above the first ILD layer 230. Because the desired inter-feature isolation characteristics are provided by the first ILD layer 230, the process tool 130 may form the second ILD layer 240 using a bulk deposition process where preventing void formation is less critical. In this exemplary implementation, the process tool 130 is a chemical vapor deposition (CVD) tool, such as a Concept Two deposition tool offered by Novellus Systems, Inc. of San Jose, Calif.

The process tool 140 performs a polishing process to planarize the second ILD layer 240, as shown in FIG. 2C. If the second ILD layer 240 is underpolished, the planarity, thickness, or uniformity may be compromised, which may interfere with formation of additional features in subsequent layers. If the second ILD layer 240 is overpolished, the insulative capability of the ILD layers 230, 240 may be reduced. In this exemplary implementation, the process tool 140 is a polishing tool, such as an Auriga or AurigaC polishing tool offered by Speedfam-IPEC, Inc. of Chandler, Ariz.

The metrology tool 150 collects data, such as thickness data, for the individual ILD layers 230, 240 (T1 and T2 respectively) or the combined ILD layers 230, 240 (T3), after processing in the process tool 130. The thicknesses of the individual ILD layers 230, 240 may be discriminated in an implementation where they are optically discernible. In the illustrated embodiment, the metrology tool 150 is a NovaScan 840D vacuum film thickness measuring tool, offered by Nova Measuring Instruments, Ltd. headquartered in Rehovot, Israel.

The controller 160 receives the metrology data (i. e., and other state data) and generates control actions for one or more of the process tools 120, 130, 140 based thereon. Variation in the measured thickness(es) of the ILD layers 230, 240 may be the result of variation introduced by the process tool 120. The controller 160 may generate a control action for the process tool 120 based on metrology data collected after processing in the process tool 130. Using this approach, the controller 160 compensates for the lack of metrology data collected for directly monitoring the performance of the process tool 120. Because the metrology tool 150 gathers data with little metrology delay, the controller 160 may also generate a feedforward control action for the process tool 140 (i.e., the polish operation) to adjust the polishing recipe based on the thickness of the combined ILD layers 230, 240. In yet another embodiment, the controller 160 may generate control actions for updating the operating recipes for all of the process tools 120, 130, 140.

The controller 160 employs a control model for each of the process tools 120, 130, 140 it desires to control. The metrology data is incorporated into control equations that define the control model and new operating recipe parameters are generated. The particular control modeling techniques used may vary, as described above. The particular operating recipe parameter(s) controlled may also vary. For the process tools 120, 130 performing deposition processes, exemplary variables that may be controlled are deposition time, plasma power (i.e., for the HDP tool), reactant gas concentration or flow rate, temperature, pressure, and gap distance (i.e., the distance between the wafer and a gas inlet). Exemplary polishing variables that may be controlled for the process tool 140 include polish time, slurry concentration, rotation speed, polishing pad speed (i.e., rotational or linear), down force, back pressure, pad pressure, arm oscillation, pad conditioning, and the like.

Figure 3:
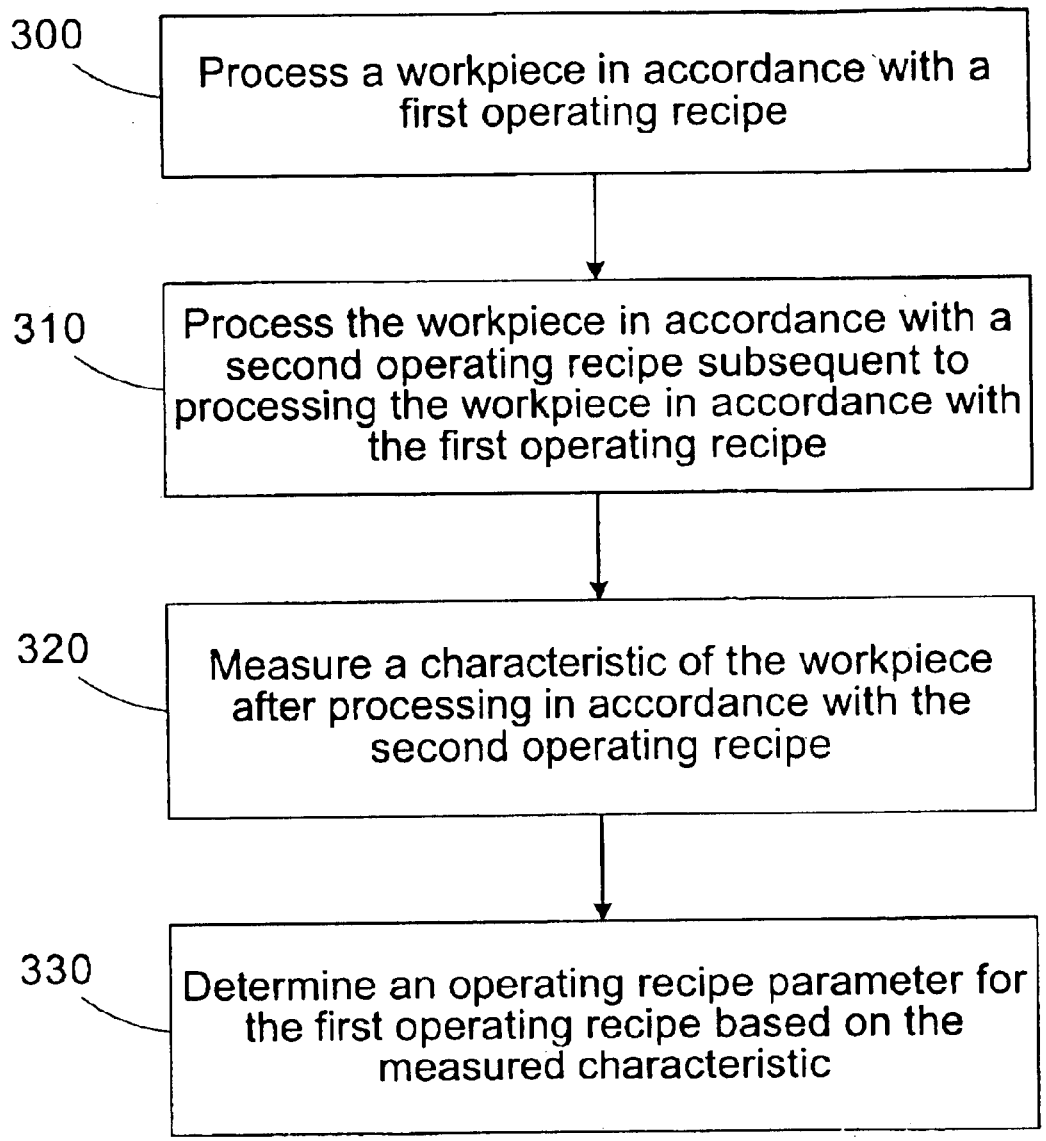
FIG. 3 is a simplified flow diagram of a method for controlling a process tool in accordance with another embodiment of the present invention.

Turning now to FIG. 3, a simplified flow diagram of a method for controlling a process tool in accordance with another embodiment of the present invention is provided. In block 300, a workpiece is processed in accordance with a first operating recipe. In block 310, the workpiece is processed in accordance with a second operating recipe subsequent to processing the workpiece in accordance with the first operating recipe. In block 320, a characteristic of the workpiece is measured after processing in accordance with the second operating recipe. In block 330, an operating recipe parameter for the first operating recipe is determined on the measured characteristic.

The control arrangement described above has numerous advantages. Controlling the recipe of the process tool 120 based on feedback metrology data collected after processing in the process tool 130 allows the process tool 120 to be controlled without requiring additional metrology resources. The integrated nature of the metrology tool 150 allows feedback and feedforward control actions to be generated with reduced metrology delay. The combination of these advantages increases the effectiveness of the process control for the process line 100

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    processing a workpiece in accordance with a first operating recipe;
    processing the workpiece in accordance with a second operating recipe subsequent to processing the workpiece in accordance with the first operating recipe;
    measuring a characteristic of the workpiece after processing in accordance with the second operating recipe;
    determining an operating recipe parameter for the first operating recipe based on the measured characteristic; and
    determining an operating recipe parameter for subsequently processing the workpiece in accordance with a third operating recipe based on the measured characteristic.

2. The method of claim 1, further comprising determining an operating recipe parameter for the second operating recipe based on the measured characteristic.

3. A method, comprising:
    forming a first process layer on a wafer in accordance with a first operating recipe;
    forming a second process layer over the first process layer in accordance with a second operating recipe;
    measuring a thickness of at least the first process layer after formation of the second process layer; and
    determining an operating recipe parameter for the first operating recipe based on the thickness measurement.

4. The method of claim 3, further comprising measuring a thickness of the second process layer.

5. The method of claim 4, further comprising determining an operating recipe parameter for the second operating recipe based on at least the measured thickness of the second process layer.

6. The method of claim 5, wherein determining the operating recipe parameter for the second operating recipe further comprises determining at least one of a deposition time parameter, a reactant gas concentration, a reactant gas flow rate, a temperature parameter, a pressure parameter, and a gap distance parameter.

7. The method of claim 3, wherein measuring the thickness further comprises measuring a combined thickness of the first and second process layers.

8. The method of claim 7, further comprising determining an operating recipe parameter for polishing the second process layer in accordance with a third operating recipe based on the combined thickness measurement.

9. The method of claim 8, wherein determining the operating recipe parameter for the third operating recipe further comprises determining at least one of a polish time parameter, a slurry concentration parameter, a rotation speed parameter, a polishing pad speed parameter, a down force parameter, a back pressure parameter, a pad pressure parameter, an arm oscillation parameter, and a pad conditioning parameter.

10. The method of claim 3, further comprising:
    measuring a thickness of the second process layer;
    determining an operating recipe parameter for the second operating recipe based on the measured thickness of at least the second process layer; and
    determining an operating recipe parameter for polishing the second process layer in accordance with a third operating recipe based on the measured thicknesses of the first and second process layers.

11. The method of claim 3, wherein forming the first process layer further comprises forming a first dielectric layer.

12. The method of claim 11, wherein forming the second process layer further comprises forming a second dielectric layer.

13. The method of claim 3, further comprising forming features on the wafer prior to forming the first process layer.

14. The method of claim 13, wherein forming the features further comprises forming interconnect structures.

15. The method of claim 13, wherein forming the features further comprises forming transistor gate electrode structures.

16. The method of claim 3, wherein determining the operating recipe parameter for the first operating recipe further comprises determining at least one of a deposition time parameter, a plasma power parameter, a reactant gas concentration, a reactant gas flow rate, a temperature parameter, a pressure parameter, and a gap distance parameter.

17. A processing line, comprising:
- a first process tool configured to process a workpiece in accordance with a first operating recipe;
- a second process tool configured in process the workpiece in accordance with a second operating recipe subsequent to the processing of the workpiece in accordance with the first operating recipe by the first process tool;
- a third process tool configured to process the workpiece in accordance with a third operating recipe subsequent to processing in the second process tool;
- a metrology tool configured to measure a characteristic of the workpiece after processing in the second process tool; and
- a controller configured to determine an operating recipe parameter for the first operating recipe and the third operating recipe based on the measured characteristic.

18. The processing line of claim 17, wherein the controller is further configured to determine an operating recipe parameter for the second operating recipe based on the measured characteristic.

19. The processing line of claim 17, wherein the metrology tool is integrated into the second process tool.

20. A processing line, comprising:
- a first process tool configured to form a first process layer on a wafer in accordance with a first operating recipe;
- a second process tool configured to form a second process layer over the first process layer in accordance with a second operating recipe;
- a metrology tool configured to measure a thickness of at least the first process layer; and
- a controller configured to determine an operating recipe parameter for the first operating recipe based on the combined thickness measurement.

21. The process line of claim 20, wherein the metrology tool is further configured to measure a thickness of the second process layer.

22. The processing line of claim 21, wherein the controller is further configured to determine an operating recipe parameter for the second operating recipe based on at least the measured thickness of the second process layer.

23. The processing line of claim 22, wherein the operating recipe parameter for the second operating recipe comprises at least one of a deposition time parameter, a reactant gas concentration, a reactant gas flow rate, a temperature parameter, a pressure parameter, and a gap distance parameter.

24. The processing line of claim 21, further comprising a third process tool configured to polish the second process layer in accordance with a third operating recipe, wherein the controller is further configured to determine an operating recipe parameter for the second operating recipe based on the measured thickness of at least the second process layer and determine an operating recipe parameter for the third operating recipe based on the measured thicknesses of the first and second process layers.

25. The process line of claim 20, wherein the metrology tool is further configured to measure a combined thickness of the first and second process layers.

26. The processing line of claim 25, further comprising a third process tool configured to polish the second process layer in accordance with a third operating recipe, wherein the controller is further configured to determine an operating recipe parameter for the third operating recipe based on the combined thickness measurement.

27. The processing line of claim 26, wherein the operating recipe parameter for the third operating recipe comprises at least one of a polish time parameter, a slurry concentration parameter, a rotation speed parameter, a polishing pad speed parameter, a down force parameter, a back pressure parameter, a pad pressure parameter, an arm oscillation parameter, and a pad conditioning parameter.

28. The processing line of claim 20, wherein forming the first process layer comprises a first dielectric layer.

29. The processing line of claim 28, wherein the second process layer comprises a second dielectric layer.

30. The processing line of claim 20, wherein the wafer includes features formed beneath the first process layer.

31. The processing line of claim 30, wherein the features further comprise interconnect structures.

32. The processing line of claim 30, wherein the features further comprise transistor gate electrode structures.

33. The processing line of claim 20, wherein the operating recipe parameter for the first operating recipe comprises at least one of a deposition time parameter, a plasma power parameter, a reactant gas concentration, a reactant gas flow rate, a temperature parameter, a pressure parameter, and a gap distance parameter.

34. A system, comprising:
- means for processing a workpiece in accordance with a first operating recipe;
- means for processing the workpiece in accordance with a second operating recipe subsequent to processing the workpiece in accordance with the first operating recipe;
- means for measuring a characteristic of the workpiece after processing in accordance with the second operating recipe;
- means for determining an operating recipe parameter for the first operating recipe based on the measured characteristic; and
- means for determining an operating recipe parameter for subsequently processing the workpiece in accordance with a third operating recipe based on the measured characteristic.

35. A system, comprising:
- means for forming a first process layer on a wafer in accordance with a first operating recipe;
- means for forming a second process layer over the first process layer in accordance with a second operating recipe;
- means for measuring a thickness of at least the first process layer; and
- means for determining an operating recipe parameter for the first operating recipe based on the combined thickness measurement.

* * * * *

UNITED STATES PATENT AND TRADEMARK OFFICE
CERTIFICATE OF CORRECTION

PATENT NO. : 6,701,206 B1  
DATED : March 2, 2004  
INVENTOR(S) : Richard J. Markle and Lance Nevala It is certified that error appears in the above-identified patent and that said Letters Patent is hereby corrected as shown below:

Column 1,
Line 2, please add the following new paragraph:
 BACKGROUND OF THE INVENTION
 -- The present application claims priority to U.S. Provisional Application Serial Number 60/288,542 filed on May 3, 2001. --

Signed and Sealed this

Eighteenth Day of May, 2004

JON W. DUDAS
*Acting Director of the United States Patent and Trademark Office*